Sept. 8, 1925. 1,552,429
W. GEE ET AL
CLAMPING DEVICE FOR USE WITH SHAPING FORMS EMPLOYED IN HOSIERY MANUFACTURE
Filed April 18, 1922
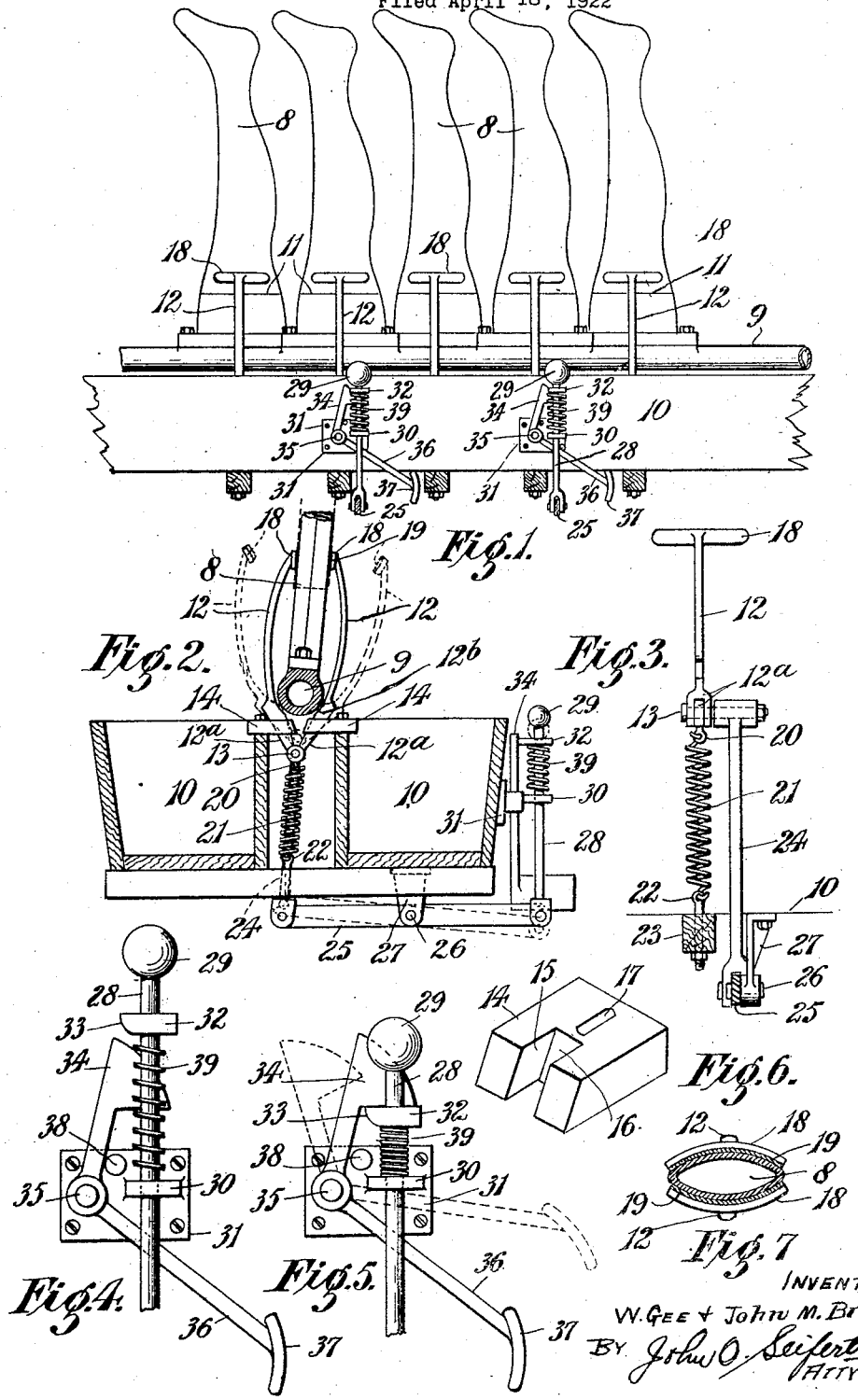

Patented Sept. 8, 1925.                                                                    1,552,429

UNITED STATES PATENT OFFICE.

WILLIAM GEE AND JOHN M. BROOKS, OF HABERFIELD, NEAR SYDNEY, NEW SOUTH WALES, AUSTRALIA.

CLAMPING DEVICE FOR USE WITH SHAPING FORMS EMPLOYED IN HOSIERY MANUFACTURE.

Application filed April 18, 1922. Serial No. 555,494.

*To all whom it may concern:*

Be it known that we, WILLIAM GEE and JOHN MCCLENAGHAN BROOKS, citizens of the United States of America, residing at No. 3 Wattle Street, Haberfield, near Sydney, in the State of New South Wales, Commonwealth of Australia, have invented new and useful Improvements in and Relating to a Clamping Device for Use with Shaping Forms Employed in Hosiery Manufacture, of which the following is a specification.

For the purpose of imparting the required shapes to hosiery and certain articles of clothing underwear, it is usual in the art to employ shaping apparatus comprising a series of metal forms which are heated to a predetermined temperature degree by a steam circulatory system. The articles to be shaped are drawn downwardly over these shaping forms and brought to gauge marks made thereon, but under the influence of heat the articles so adjusted on the forms frequently creep upwardly. As a consequence an appreciable proportion of the manufactured articles are not of first quality as they are imperfectly shaped and lack in length uniformity, whereby the additional manufacturing operations of pairing and grading into first and second qualities are necessitated.

The present invention has been devised to provide simple and effectively operating clamping devices for use with heated shaping forms employed in the manufacture of hosiery and clothing underwear, and arranged whereby both sides of the articles will be clamped and maintained in the exact and correctly determined positions on the shaping forms, thereby ensuring positive uniformity of lengths, and the obtainment of perfect shapes and quality improvement, while dispensing with or reducing to a minimum the costs of and incidental to the performance of pairing operations.

Salient features of a clamping device according to the invention reside in the provision of clamp elements adapted to be brought to bear simultaneously upon opposite sides of an article adjusted on a heated shaping form and to be simultaneously released therefrom: knee or foot actuating means so arranged as to permit the operator to have free action of both hands in adjusting the articles on the forms prior to and at the time of clamping: means for locking said clamp elements in their closed position: and means for readily releasing said clamp elements to permit removal of the shaped articles from the forms, said means also functioning to maintain the clamp elements in open position to facilitate the placing of other articles on the shaping forms.

Reference is had to the accompanying drawings, illustrating a clamping device which is representative of the invention, and wherein:

Figure 1 is a view in side elevation (on a reduced scale) of portion of a shaping apparatus having a series of forms each of of which is fitted with an independently actuated clamping device.

Figure 2 is a vertical section.

Figure 3 is a detail view in sectional elevation.

Figure 4 is a detail view illustrating means for simultaneously actuating a pair of clamp arms, the parts being shown in the positions assumed when said arms are closed against opposite faces of a shaping form.

Figure 5 is a similar view to Figure 4, but shows the parts in the positions assumed when the clamp arms are retained open so as to be free of the shaping form, while broken lines indicate the release position of the pawl following the operation of a knee-lever.

Figure 6 is a detail view of a guide block hereinafter described.

Figure 7 is a sectional plan illustrating a shaping form and a pair of clamping arms closed thereon.

Figures 3 to 7 are drawn to a larger scale than that of either Figure 1 or Figure 2.

In factory equipment employed for shaping operations in the manufacture of hosiery and certain classes of clothing, it is customary to provide a series of metal forms as 8 which are heated interiorly by steam caused to circulate through passages therein. These forms are mounted upon a steam supply pipe 9 with which they are in communication, and they are set slightly out of the vertical, alternating in the direction of inclination so as to facilitate the work of placing hosiery or like articles on and removing the same from the forms by operatives who are disposed on opposite sides of the apparatus.

The hosiery or other articles to be shaped are delivered to longitudinally disposed troughs 10 on opposite sides of the forms 8, and from these they are taken by operatives and pulled downwardly on the forms until the extreme edge of the top portions are brought to coincide with gauge markings 11 made on said forms.

Each of the shaping forms 8 is furnished with a work clamping device comprising a pair of curved and tongs-like clamp arms 12 disposed on opposite sides of the form and having downward extensions 12ª pivotally connected at their lower ends by means of a knuckle hinge joint 13 at a point beneath the steam supply pipe 9. These extensions pass through guide slots 15 in blocks 14, each slot being arranged with an inclined cam face 16. Said guide blocks which are bolted to the upper portion of the troughs framing are constructed with elongated apertures 17—see Figure 6— to facilitate their attachment and also their location adjustment, and they function to positively cause the clamping arms to close about the form, when a downward pull is exerted on same, in the manner hereinafter described.

The upper ends of the clamp arms 12 are fitted with grip members 18 to correspond to the configuration of the form 8 and are furnished on their inner faces with strips 19 of felt or like suitable material that will not mark or otherwise damage the hosiery or like articles against which they bear in the clamping operations.

The extensions of the clamp arms 12 are constructed with inward projections 12ᵇ adapted to contact with the steam supply pipe 9 and thereby ensure said clamp arms being positively opened to a required degree so as not to hinder an operative in drawing hosiery or like articles over the heated shaping form.

Fixedly secured to one of the extensions 12ª of the pair of curved clamp arms 12 is an eye 20 to provide attachment means for one end of a helical spring 21 that is anchored at its opposite end to an eye-bolt 22 secured to a beam 23 on the underside of the troughs 10. This spring 21 which is disposed directly beneath the pivot pin of the knuckle-joint 13 is of sufficient strength to maintain the clamp arms closed with their grip members 18 in operative positions on the work-piece, as illustrated in Figure 2.

A rod or link 24 is pivotally attached at its upper end to the pivot pin of the knuckle-joint 13, and it depends in parallel relationship with the spring 21, having its lower end pivotally secured to the inner end of a horizontal rocking bar 25 which is fulcrumed at or about its centre point upon the pin 26 in a bracket 27 that is secured to the trough.

A vertical push-rod 28 having at its upper end an operating knob 29 is pivotally attached at its lower end to the outer portion of the rocking bar 25. This rod passes freely through a guide 30 formed on a bracket 31 which is affixed to the trough 10 and it has rigidly affixed near to its upper end a lug or latch 32 having a cam-like face 33 adapted to bear against the upper curved end of a pawl or dog 34 which is pivoted at 35 to said bracket 31. Upon a downward movement being imparted to the push-rod 28, the lug 32 operatively contacts with the pawl 34 thereby causing it to be moved outwardly on its pivot until said lug effects clearance of the curved portion of the pawl when an interlocking engagement between the two members is automatically effected as illustrated in Figure 5.

The pawl or dog 34 is constructed with an extension in the form of a release lever 36 furnished at its lower extremity with a shaped piece 37 for convenience of operation by the operator's knee. It will be at once understood that the lever 36 could be extended downwardly and arranged to be actuated by the operator's foot.

The release lever 36 is disposed angularly to the dog or pawl 34, functioning additionally as a counter-balance to maintain the latter in effective engagement with the lug 32, while a pin or stud 38 on said bracket 31 limits the forward movement of said pawl.

A compression spring 39, weaker than the spring 21, encircles the rod 28 between the guide 30 and the lug or latch 32 to effect the return of said rod when released from the pivoted pawl 34 by movement being imparted to the knee-piece 37.

In action, the vertical push-rod 28 is depressed and acting through the rocking-lever 25 imparts upward movement to the rod or link 24 connected at its upper extremity to the knuckle-hinge connection 13 of the oppositely curved clamp arms 12. This upward movement causes said clamp arms to be elevated against the tension of the spring 21 and opened, the inclined guide faces 16 of the blocks 14 and contact of the projections 12ᵇ with the pipe 9 positively ensuring the required opening movement being had. Said clamp arms are locked in open position by the engagement of the lug or latch 32 and the pawl 34 in the manner before described.

When an article of hosiery or the like has been correctly adjusted on the heated shaping form 8, knee action on the release lever 36 trips the pawl 34, when the release of tension on the springs 21 and 39 causes the rod or link 24 to be drawn downwardly, whereby the clamp arms are closed so that their grip members 19 bear tightly against the tops of the hosiery in such manner as to prevent movement thereof until again opened by the operation of the push-rod 28 in the manner aforesaid.

It will be understood that the grip members 18 may be of any desired length to prevent movement of the articles being shaped, and for this purpose they may be extended so as to form a complete enclosure around the shaping form 8.

What we do claim is:—

1. In apparatus for shaping hosiery and underwear, a shaping form, means to which said form is connected to supply a heating medium to the interior thereof, a pair of oppositely disposed clamping arms pivotally connected together at their lower ends, blocks disposed at opposite sides of said form arranged with cam slots in which the arms are slidably mounted, means for imparting longitudinal movement to said arms in the guide blocks to cause said clamping arms to simultaneously bear upon opposite sides of the article on said shaping form when moved in one direction in the blocks and for releasing said arms from the form when moved in an opposite direction and in said latter position maintain the arms in contact with means for supplying the heating medium to the form, and means for releasably locking the arm actuating means in position with the arms out of engagement with the article on the form.

2. In apparatus for shaping hosiery and underwear, a heated shaping form provided with a pair of clamping arms pivoted together at their lower ends and fitted with grip members at their upper ends to engage an article on the form, guide blocks in which the arms are slidably mounted, manually operative means for moving said clamping arms longitudinally in one direction in the guide blocks and simultaneously away from the article on the form and locking them in said position, a lever to release said clamping arms, and means operative upon the releasing of the arms to effect longitudinal movement in an opposite direction to the arms in the blocks and simultaneously into engagement with an article on the form and yieldingly maintain the arms in said position.

3. In apparatus for shaping hosiery and underwear, a shaping form, a pair of curved clamping arms pivoted together at their lower ends and furnished with grip members at their upper ends, guide blocks in which the arms are mounted at opposite sides of the form to have longitudinal sliding movement, a lever connected at one end to the pivotal connection of the arms, a spring yieldingly urging the lever to move the arms in one direction in the guide blocks and into engagement with the article on the form, means to actuate said lever against the action of said yielding means to move the arms in an opposite direction and away from the form, means to releasably lock the lever with the arms in said latter position, and means for tripping said locking means whereby said arms will be automatically moved to position to bear simultaneously against opposite sides of the article on the shaping form.

4. In apparatus for shaping hosiery and the like, a pair of parallelly arranged troughs, a pipe for conveying a heating medium disposed between said troughs, forms mounted successively upon said pipe in communication therewith, the alternate forms being inclined slightly to the perpendicular in opposite directions, a pair of blocks disposed at opposite sides of said pipe in line with each form and arranged with cam slots, clamping arms slidably mounted in the guide blocks pivotally connected at their lower ends and their upper ends engaging at opposite sides of and arranged to conform to the forms, a pivoted lever having a connection at one end with each pair of levers, means to co-operate with said lever to normally urge the same to move the arms in the guide blocks and position the arms in engagement with the article on the forms, and means to actuate the lever against the action of said yielding means to move the arms in the guide blocks and away from the forms, said arms being arranged to engage with the pipe for the heating medium in said latter position, and means for releasably locking the arm and actuating levers in said latter position.

5. In apparatus for shaping hosiery and underwear, a shaping form, a pair of curved clamp arms pivoted together at their lower ends by a knuckle-joint, an anchored spring connected to said knuckle-joint, a rocking lever, a vertical rod pivotally connected to said knuckle-joint and to one end of said rocking lever, a push-rod connected to the opposite end of said rocking lever, a pivoted pawl, a latch on said push-rod adapted to operatively engage and interlock with said pawl, a release lever on said pawl, and a knee-piece on said release lever by the operation of which said pawl is tripped, substantially as described.

6. In apparatus for shaping hosiery and underwear, a shaping form mounted upon a steam supply pipe, a pair of curved clamping arms pivoted together at their lower ends by a knuckle-joint, recessed guide blocks slidably accommodating the lower converging ends of said arms, projections on said arms adapted to contact with said pipe, an anchored spring connected to said knuckle-joint, a fulcrumed rocking lever, a vertical rod connected to said knuckle-joint and to said rocking lever, an operating push-rod, a latch on said push-rod, a pivoted pawl adapted for engagement by said latch, a release lever on said pawl, means for actuating said release lever to trip said pawl, and a spring on said push-rod aiding its return movement after the tripping of said pawl, substantially as described.

In testimony whereof we affix our signatures.

WILLIAM GEE.
JOHN M. BROOKS.